United States Patent [19]

Kuwahara

[11] Patent Number: 5,303,802

[45] Date of Patent: Apr. 19, 1994

[54] EDDY CURRENT BRAKING SYSTEM

[75] Inventor: Tohru Kuwahara, Kawasaki, Japan

[73] Assignee: Isuzu Motors Ltd., Tokyo, Japan

[21] Appl. No.: 73,408

[22] Filed: Jun. 7, 1993

[30] Foreign Application Priority Data

Nov. 8, 1991 [JP] Japan .................................. 3-100254
Oct. 21, 1992 [JP] Japan ............................ 4-307527[U]

[51] Int. Cl.⁵ ......................... B60L 7/28; H02K 49/02
[52] U.S. Cl. .................................... 188/158; 188/164; 188/267; 310/93; 310/105
[58] Field of Search ............... 188/158, 159, 161, 164, 188/267; 310/105, 93

[56] References Cited

U.S. PATENT DOCUMENTS 5,143,183 9/1992 Kuwahara ............................ 188/158
5,248,133 9/1993 Okamoto et al. ................. 188/161 X

FOREIGN PATENT DOCUMENTS 2057610 4/1981 United Kingdom ................. 188/164

Primary Examiner—Robert J. Oberleitner
Assistant Examiner—Peter M. Poon
Attorney, Agent, or Firm—John E. Toupal; Harold G. Jarcho

[57] ABSTRACT

A vehicle braking system including a brake structure defining an annular surface; an annular magnet support disposed adjacent to the annular surface; a plurality of permanent magnets mounted on the magnet support and circumferentially spaced apart thereon, the polarities of the plurality of permanent magnets alternating circumferentially and each permanent magnet having circumferentially spaced apart end portions of substantially equal cross-sectional area joined by a middle portion of substantially smaller cross-sectional area; an annular pole piece support; and a plurality of ferromagnetic pole pieces mounted on the pole piece support and circumferentially spaced apart in positions between the annular surface and the permanent magnets, each pole piece having a circumferential length substantially equal to the circumferential length of a radially adjacent permanent magnet. Also included is an adjustment mechanism for producing relative angular movement between the magnet support and the pole piece support so as to change the circumferential alignment between the pole pieces and the permanent magnets.

14 Claims, 6 Drawing Sheets

EDDY CURRENT BRAKING SYSTEM

BACKGROUND OF THE INVENTION

This invention relates generally to a braking system for use principally on a large vehicle and, more particularly to an eddy-current type retarder for assisting a friction brake.

An eddy-current type retardation device disclosed in Japanese Patent Laid-Open Publication No. 298948/1989 is illustrated in FIG. 13. In that device a ring 14 supports a plurality of permanent magnets 14A circumferentially spaced apart at a uniform pitch and arranged within a brake drum 7 connected to a rotational shaft, and the polarities of the permanent magnets facing the brake drum being alternately different. Between the brake drum and the magnet ring is a non-magnetic, rotatable ring 10 retaining pole pieces 15 having substantially the same area as the permanent magnets and circumferentially spaced at the same pitch.

When the pole pieces 15 are moved to positions directly adjacent to the permanent magnets 14A, a magnetic field is directed thereby through the pole pieces to act on the brake drum 7. Accordingly, an eddy current flows in the brake drum, producing a braking torque. However, when the pole pieces are rotated into positions (FIG. 13) wherein each pole piece 15 is directly adjacent to two magnets 14A circumferentially adjacent to each other, a magnetic closed circuit y is produced passing through the adjacent permanent magnets, the pole piece adjacent thereto and the magnet support ring 14. Consequently, the magnetic field applied to the brake drum is significantly weakened, and the braking torque received becomes extremely small.

However, in the above system a problem is presented by magnetic flux Z that leaks from the center portions of the permanent magnets 14A not covered by an adjacent pole piece 15. That leakage flux acts on the brake drum producing an undesirable dragging torque. If the thickness of the control cylinder is increased in order to minimize magnetic leakage flux from the permanent magnets to the brake drum, the entire device increases in weight, and a spacing between the permanent magnets and the brake drum is increased. Consequently, the magnetic field which permeates the pole pieces from the permanent magnets and reaches the brake drum at the time of braking decreases and the braking torque is diminished.

The above problems are to some extent obviated by a braking system disclosed in U.S. Pat. No. 5,143,183. However, for an equal degree of braking, that system requires the use of twice as many permanent magnets.

The object of the present invention, therefore, is to provide an eddy current type retardation device which without increased weight or additional permanent magnets substantially eliminates magnetic leakage flux during non-braking periods and generates high braking torque during braking periods.

SUMMARY OF THE INVENTION

The invention is a vehicle braking system including a brake structure defining an annular surface; an annular magnet support disposed adjacent to the annular surface; a plurality of permanent magnets mounted on the magnet support and circumferentially spaced apart thereon, the polarities of the plurality of permanent magnets alternating circumferentially and each permanent magnet having circumferentially spaced apart end portions of substantially equal cross-sectional area joined by a middle portion of substantially smaller cross-sectional area; an annular pole piece support; and a plurality of circumferentially spaced apart ferromagnetic pole pieces separated by non-magnetic gaps and mounted on the pole piece support and in positions between the annular surface and the permanent magnets, each pole piece having a circumferential length substantially equal to the circumferential length of a radially adjacent permanent magnet. Also included is an adjustment mechanism for producing relative angular movement between the magnet support and the pole piece support so as to change the circumferential alignment between the pole pieces and the permanent magnets. The adjustment mechanism provides alternately a braking condition in which each of the permanent magnets is radially aligned with one of the pole pieces and a non-braking condition in which each of the magnet middle portions is radially aligned with one of a non-magnetic gap between the pole pieces. The reduced cross-sectional areas of the middle magnet portions increases the reluctance of the magnetic path between the pole pieces thereby reducing magnetic leakage through the brake structure during non-braking conditions of alignment.

According to other features of the invention, all of the permanent magnets are of substantially equal circumferential length, and the pole pieces and permanent magnets are circumferentially spaced apart at a uniform pitch. This arrangement optimizes braking performance.

According to another feature of the invention, each magnet middle portion defines a recess that provides the smaller cross-sectional area. The desired increase in magnetic reluctance is established easily by the recesses in the magnets.

According to yet another feature of the invention, each recess has a circumferential length substantially equal to the circumferential length of an adjacent non-magnetic gap. Braking and non-braking performance are enhanced by this geometrical relationship.

According to further features of the invention, each recess means is either filled with a non-magnetic material or covered by a non-magnetic member. These features increase the structural strength of the magnets thereby facilitating the desired reduction in their central cross-sectional areas.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
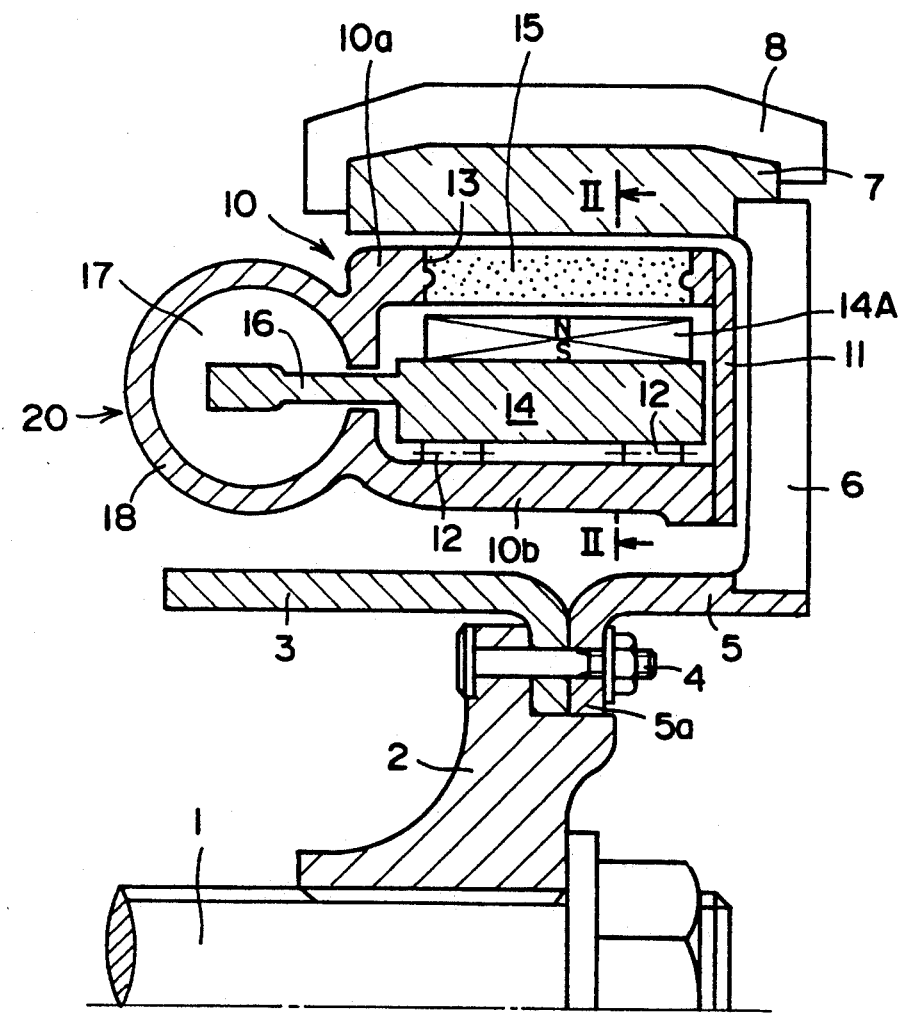
FIG. 1 is a side view in section of an eddy current braking system according to the present invention.

An eddy current type retardation braking system according to the present invention comprises a brake drum 7 fixed for example, to a rotatable output shaft 1 of a vehicular transmission or speed change gear (not shown). The drum 7 defines an annular inwardly directed cylindrical surface. A fixed annular pole piece supporting frame 10 formed of a non-magnetic material is arranged radially interiorly of the brake drum 7, and an annular magnet support ring 14 formed of magnetic material is rotatably supported radially within the fixed frame 10. Connecting the brake drum 7 and a boss 5 are spokes 6. A flange portion 5a of the boss 5 and an end wall portion of a parking brake drum 3 are secured by bolts 4 to a mounting flange 2 which is fitted into a rotational shaft 1. Cooling for the brake drum 7 is provided by cooling fins 8.

The cylindrical fixed frame 10 includes an annular C-shaped portion defining an annular chamber closed by an annular cover plate 11. Preferably, the fixed frame 10 is secured by suitable means to a gear box wall of a transmission (not shown). A plurality of ferromagnetic plates or pole pieces 15 are fastened to an outer cylindrical portion 10a of the fixed frame 10 at circumferentially spaced apart positions of uniform pitch. The frame 10 provides non-magnetic gaps between the pole pieces 15. Preferably, the pole pieces 15 are cast within the fixed frame 10 when it is molded. The magnet support ring 14 is rotatably supported within the fixed frame 15 on an inner cylindrical portion 10b thereof.

Figure 2:
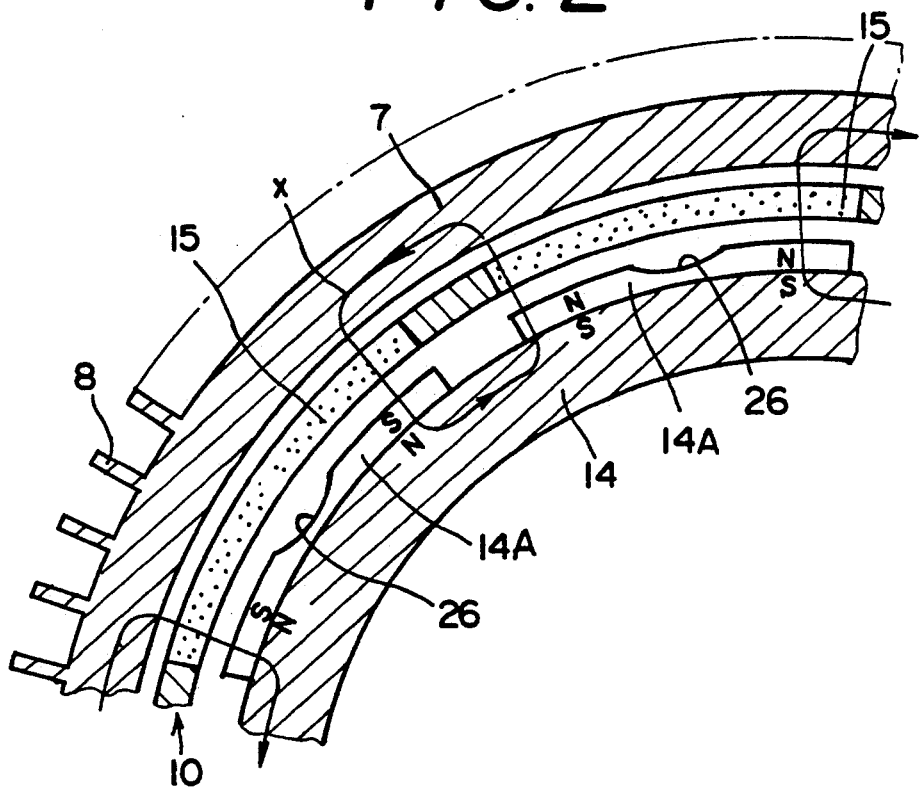
FIG. 2 is a partial front view in section, showing the relationship between ferromagnetic plates and magnets at the time of braking for the system of FIG. 1.
Figure 3:
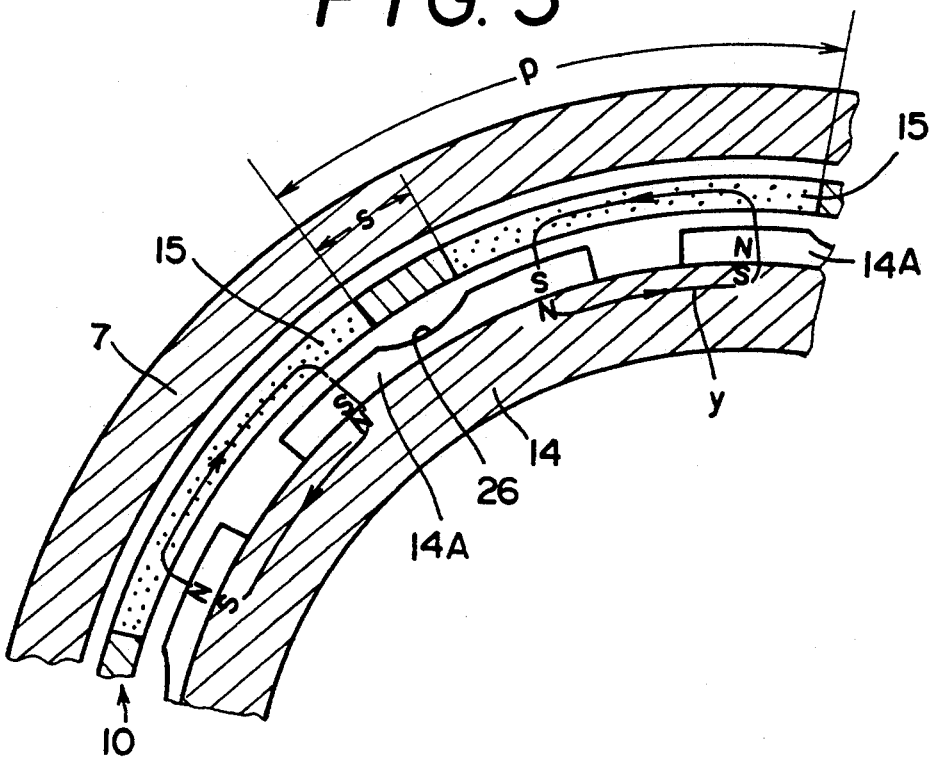
FIG. 3 is a partial front view in section, showing the relationship between ferromagnetic plates and magnets at the time of non-braking for the system of FIG. 1.

Fluid pressure actuators 20 (only one is shown) are connected at peripherally equal intervals to a left end wall of the fixed frame 10. Each fluid pressure actuator 20 comprises a cylinder 18 into which a piston 17 is fitted. An arm 16 projecting from the magnet support ring 14 via a slot in a left end wall of the fixed frame 10 is connected to a rod projecting outwardly from the piston 17. A plurality of permanent magnets 14A equaling the number of pole pieces 15 are circumferentially spaced apart on the support ring 14 at a uniform pitch equal to that of the pole pieces 15. While the magnet supporting ring 14 is normally and reciprocatively rotated angularly by a one-half pitch of the ferromagnetic plates 15 by the hydraulic actuator, it is to be noted that the magnet supporting ring 14 may be fixed and the guide tube 10 rotated instead by an electric motor (not shown). As shown in FIGS. 2 and 3, the polarities of the magnets 14A facing the brake drum 7 alternate circumferentially on the ring 14. Also each pole piece 15 has a circumferential length substantially equal to the circumferential lengths of the magnets 14A.

As shown in FIGS. 1 and 2, each magnet 14A has circumferentially spaced apart end portions joined by a central portion that defines a depression or recess 26 having an arcuate shape. The provision of the recess 26 decreases a wall thickness of the middle portion of the magnet 14A thereby increasing the spacing between the middle portion 26 and the brake drum 7. That increases magnetic reluctance and thereby weakens the magnetic field leakage to the brake drum 7 from the middle of the magnet 14A as compared with its end portions.

The operation of the braking system according to the present invention is as follows. During a braking condition, as shown in FIG. 2, each magnet 14A is radially aligned with one ferromagnetic plate 15 to provide a magnetic circuit X including the brake drum 7, adjacent ferromagnetic plates 15, adjacent magnets 14a, and the magnet support ring 14. When the rotating brake drum 7 crosses that magnetic field, eddy current flows in the brake drum 7, producing a braking torque. The middle portion of the magnet 14A, although reduced in cross-section by the presence of the recess 26, does not at this time significantly affect braking operation.

During a non-braking condition shown in FIG. 3, the magnet supporting ring 14 is rotated by a half pitch (p/2) angular shift of the ferromagnetic plates 15 by the hydraulic actuator 20. That movement radially aligns two magnets 14A of different polarity with each ferromagnetic pole piece 15 and radially aligns each magnet recess 26 with a non-magnetic gap between each pair of circumferentially adjacent pole pieces 15. A short-circuited magnetic circuit "y" is created between each pole piece 15 and the magnet supporting ring 14, and magnets 14A do not exert magnetic fields on the brake drum 7.

During a period of non-braking, the recess 26 of each magnet 14A is radially aligned with a non-magnetic gap "s" of equal circumferential length between ferromagnetic pole pieces 15 adjacent to each other. Because of the increased magnetic reluctance provided by the recesses 26, the magnetic fields that leak from the magnets 14A to the brake drum 7 via the gaps "S" is extremely small and the brake drum 7 receives little dragging torque. The increased magnetic reluctance results from the fact that the middle portion of the magnet 14A is thin in wall thickness and therefore the spacing between the outer peripheral surface of each middle magnet portion 26 and the inner peripheral surface of the brake drum 7 is increased.

Figure 4:
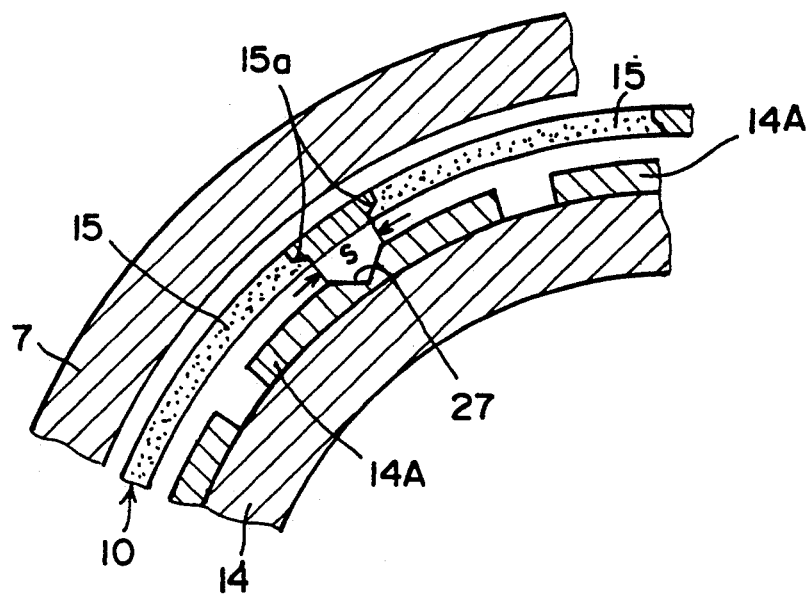
FIG. 4 is a front view in section, showing the relationship between ferromagnetic plates and magnets at the time of non-braking for a second embodiment according to the present invention.

In another embodiment of the invention, the arcuate recess 26 is replaced by a V-shape recess 27, as shown in FIG. 4. The circumferential width of the recess 27 having a V-shape section is reduced and end edge portions of the ferromagnetic pole pieces 15 are provided with circumferential projections 15a to establish gaps "s" between the ferromagnetic plates 15 equal in length to the recesses 27. Accordingly, leakage of magnetic field to the brake drum 7 is further reduced.

Figure 5:
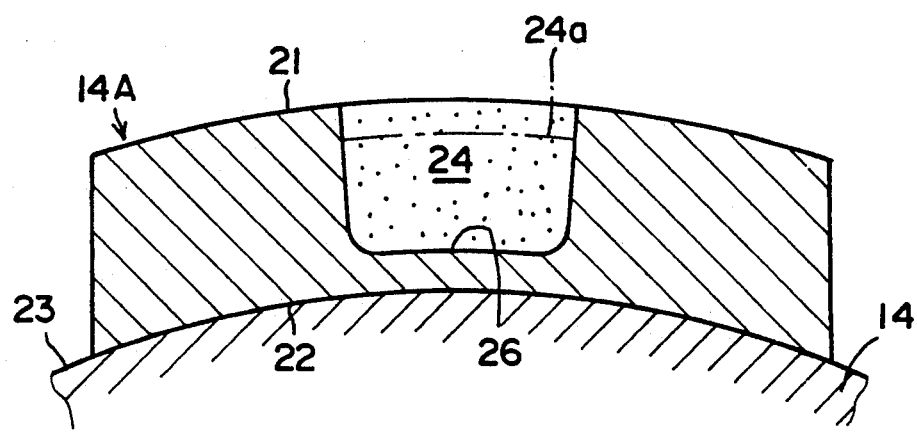
FIG. 5 is a front view in section, showing a magnet of a third embodiment according to the present invention.

Shown in FIG. 5 is another embodiment in which each magnet 14A is provided with a groove-shaped recess 26 in a middle portion of its outer peripheral surface 21 and facing the brake drum 7. The recess 26 extends in an axial direction with respect to the brake drum 7. A reinforcement substance 24 of non-magnetic material or magnetic material weaker than the magnet 14A fills the recess 26 and is applied, for example, by embedding or the like. In the illustrated embodiment, the reinforcement member 24 forms an outer surface continuous with the outer peripheral surface 21 of the magnet 14A. However, for the purpose of reducing a weight, the recess 26 need not be fully filled but could establish a depressed surface 24a shown in the drawing depending upon the degree of magnet reinforcement desired.

Preferably, the magnet 14A is constructed by pre-molding magnet material powder into a shape having the recess 26 which then is filled with a non-magnetic reinforcement member 24 such as copper, ceramics (carbide, nitride, and boride), etc., or a mixture with a weakened magnetic property such as an oxide (including a ferrite family) and sintered into a block with an arcuate surface as shown. Alternatively, the reinforcement member 24 may be fixed into the recess 26 in the following manner. After the magnet 14A has been produced into a curved block, a non-magnetic metal such as copper is cast into the recess 26, or a settable fiber reinforced plastic (FRP) or a fiber reinforced metal (FRM) is poured into the recess 26. The magnet 14A can be magnetized either before or after it is fastened on the magnet supporting ring 14.

The recess 26 enlarges the magnetic gap between the peripherally middle portion of the magnet 14A and the brake drum 7 and thereby reduces the strength of the magnetic field therebetween. Since the reinforcement member 24 is fixed within the recess 26, the structural strength of the magnet 14A is increased to prevent the occurence of cracks in the reduced area intermediate portion of the magnet 14A. In the absence of the reinforcement member 24, such cracks could be produced by the magnetic repulsion force generated between the opposite ends of the magnet either during or after magnetization.

Figure 6:
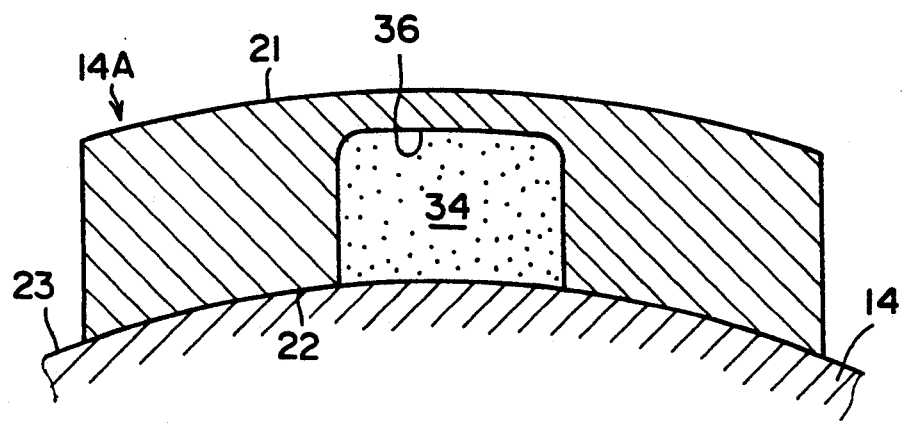
FIG. 6 is a front view in section, showing a magnet of a fourth embodiment according to the present invention.

Illustrated in FIG. 6 is another embodiment in which an axially extending groove-shaped recess 36 is provided in a middle portion of an inner peripheral surface 22 of a magnet 14A and facing the magnet support 14. A reinforcement member 34 similar to the member 24 in the embodiment shown in FIG. 5 is fastened within the depression 36 by a method similar to those previously described. Again, the magnet 14A is formed into a curved block having an arcuate outer surface.

Figure 7:
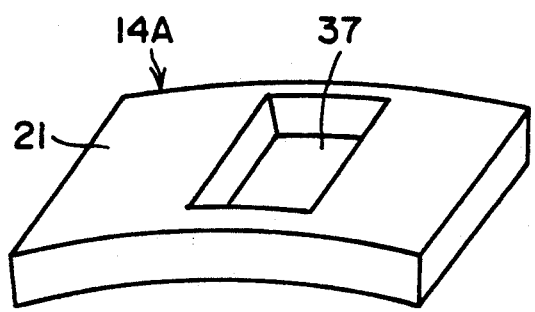
FIG. 7 is a perspective view, showing a magnet of a fifth embodiment according to the present invention.
Figure 8:
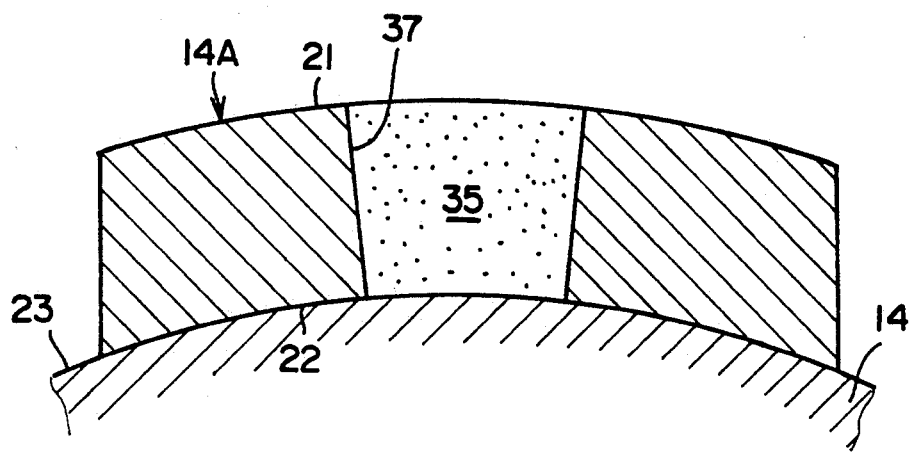
FIG. 8 is a front view in section, showing the magnet of FIG. 7.

Shown in FIGS. 7 and 8 is another embodiment in which a magnet 14A is provided with a perpendicularly extending rectangular opening 37. A reinforcement member 35 similar to that of the embodiment shown in FIG. 5 is fastened within the opening 37 by a method similar to those previously described. Again, the magnet 14A is formed into a curved block with an arcuate outer surface. In the case of a thick magnet 14A, there can be provided a rectangular opening extending in an axial direction with respect to the brake drum 7 and through the magnet's side walls. Such an opening would retain a reinforcement member of the type described.

Figure 9:
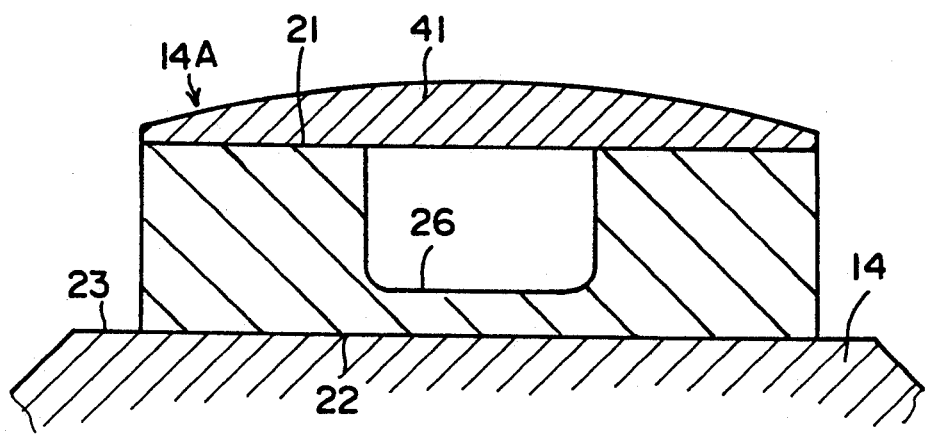
FIG. 9 is a front view in section, showing a magnet of a sixth embodiment according to the present invention.
Figure 10:
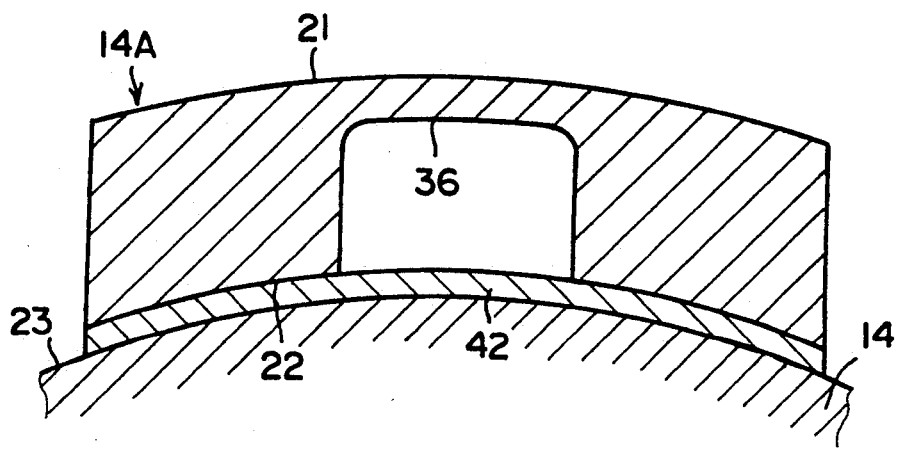
FIG. 10 is a front view in section, showing a magnet of a seventh embodiment according to the present invention.
Figure 11:
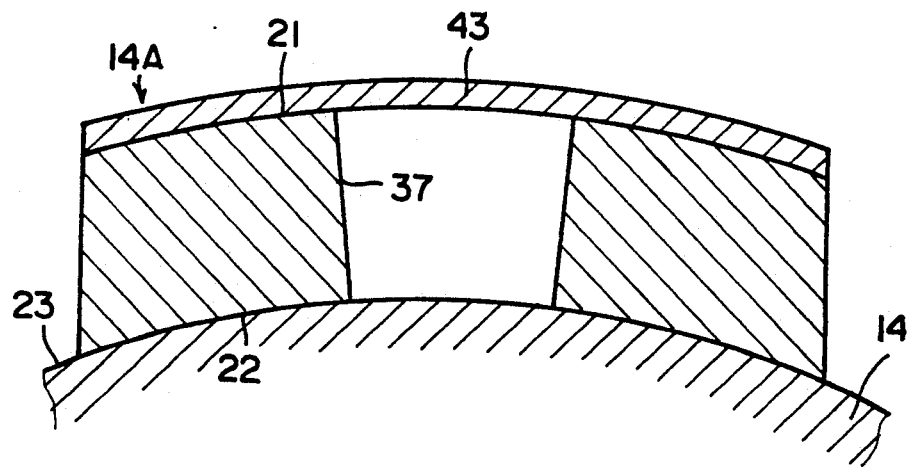
FIG. 11 is a front view in section, showing a magnet of an eighth embodiment according to the present invention.

Illustrated in FIGS. 9 to 11 are other embodiments in which recesses in a magnet 14A are covered respectively, by reinforcement plates 41-43 formed, for example, of copper, oxide (including a ferrite family) having magnetic property, fiber reinforced plastic (FRP), or fiber reinforced metal (FRM). The members 41-43 are fixed, respectively, on the outer peripheral surfaces 21 or the inner peripheral surface 22 of the magnets with, for example, adhesives, bolts or the like. Particularly, if an iron plate is used for the reinforcement plates 41-43, its outer surface can be finished by machining. The plates 41-43 function in the same manner as the filler members 24, 34 and 35 to increase the structural strength of the magnets 14A.

In the embodiment shown in FIG. 9, the magnet 14A is provided with a recess 36 in its outer peripheral surface 21, and a reinforcement plate 41 fastened on the outer peripheral surface 21 to cover the recess 36. The magnet 14A is pre-molded into a rectangular parallelopiped shape and provided with the recess 26 and, thereafter, the reinforcement plate 41 is fastened on the outer peripheral surface 21 by adhesives, stainless bolts or the like. The magnet 14A has its inner peripheral surface 22 fixed on a flat outer surface 23 in the shape of a regular polygon of a magnet supporting ring 14. Thereafter the outer surface of the reinforcement plate 41 is finished into an arcuate shape peripherally by mechanical grinding or the like.

In the embodiment shown in FIG. 10, the magnet 14A is provided with a recess 36 in its inner peripheral surface 22, and an arcuately shaped reinforcement plate 42 is superposed and fastened on the inner peripheral surface 22 so as to cover the recess 36.

In the embodiment shown in FIG. 11, the magnet 14A is provided with an opening 37 in a middle portion similarly to the embodiment shown in the FIG. 7. A reinforcement plate 43 is superposed and fastened on the outer peripheral surface 21 of the magnet 14A so as to cover the opening 37.

Figure 12:
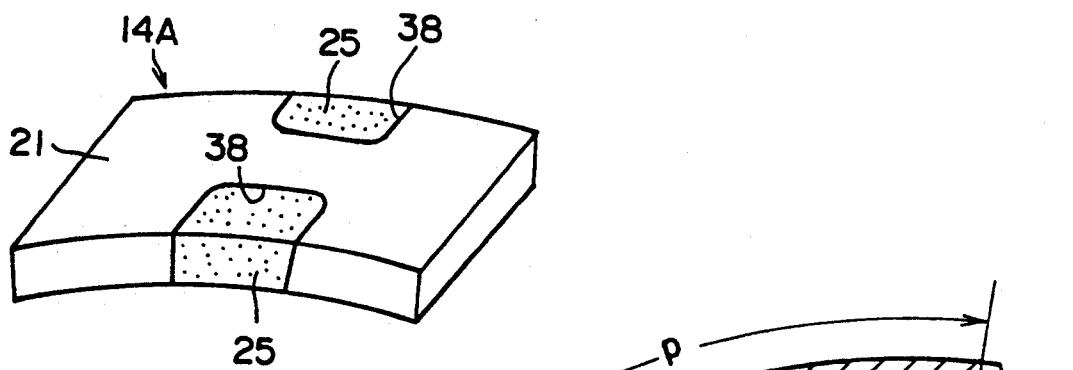
FIG. 12 is a perspective view, showing a magnet of a ninth embodiment according to the present invention.
Figure 13:
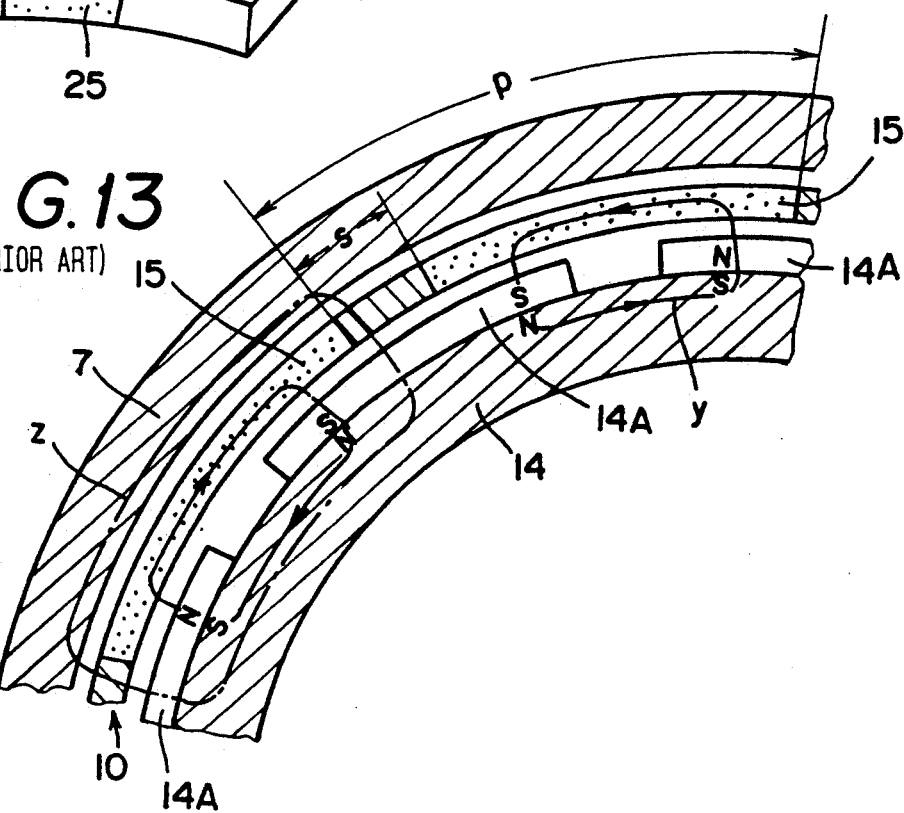
FIG. 13 is a front view in section, showing the relationship between ferromagnetic plates and magnets at the time of non-braking in a prior art eddy current braking system.

Shown in FIG. 12 is another embodiment in which a magnet 14A is provided at its opposite end walls with recesses or grooves 38. Filling the recesses 38 are reinforcement members 25 formed, for example, of copper, oxide (including a ferrite family) having magnetic property, ceramics, fiber reinforced plastics (FRP), or fiber reinforced metal (FRM). The members 25 are fixed within and fill the recesses 38.

Obviously, many modifications and variations of the present invention are possible in light of the above teachings. It is to be understood, therefore, that the invention can be practiced otherwise than as specifically described.

What is claimed is:

1. A vehicle braking system comprising:
   a brake structure defining an annular surface means;
   annular magnet support means disposed adjacent to said annular surface means;
   a plurality of permanent magnets mounted on said magnet support means and circumferentially spaced apart thereon, the polarities of said plurality of permanent magnets alternating circumferentially and each said permanent magnet having circumferentially spaced apart end portions of substantially equal cross-sectional area joined by a middle portion of substantially smaller cross-sectional area;
   annular pole piece support means;
   a plurality of ferromagnetic pole pieces mounted on said pole piece support means and circumferentially spaced apart in positions between said annular surface means and said permanent magnets, each said pole piece having a circumferential length substantially equal to the circumferential length of a radially adjacent said permanent magnet; and adjustment means for producing relative angular movement between said magnet support means and said pole piece support means so as to change the circumferential alignment between said pole pieces and said permanent magnets.

2. A braking system according to claim 1 wherein said pole piece support means provides non-magnetic gap between said circumferentially spaced apart pole pieces.

3. A braking system according to claim 2 wherein said adjustment means is adapted to provide alternately a braking condition in which each of said permanent magnets is radially aligned with one of said pole pieces and a non-braking condition in which each of said middle portions is radially aligned with one of said non-magnetic gaps between said pole pieces.

4. A braking system according to claim 3 wherein all of said permanent magnets are of substantially equal circumferential length.

5. A braking system according to claim 4 wherein said pole pieces and said permanent magnets are circumferentially spaced apart at a uniform pitch.

6. A braking system according to claim 3 wherein each said middle portion defines recess means that provides said smaller cross-sectional area.

7. A braking system according to claim 6 wherein each said recess means has a circumferential length substantially equal to the circumferential length of an adjacent said non-magnetic gap.

8. A braking system according to claim 6 wherein each said recess means is filled with a non-magnetic material.

9. A braking system according to claim 6 wherein each said recess means faces said pole piece support means.

10. A braking system according to claim 9 wherein each said recess means is filled with a non-magnetic material.

11. A braking system according to claim 9 including a non-magnetic member covering each of said recess means.

12. A braking system according to claim 6 wherein each said recess means faces said magnet support means.

13. A braking system according to claim 12 wherein each said recess means is filled with a non-magnetic material.

14. A braking system according to claim 12 including a non-magnetic member covering each of said recess means.

* * * * *